United States Patent
Gisch et al.

(10) Patent No.: US 10,258,903 B2
(45) Date of Patent: Apr. 16, 2019

(54) CHROMATOGRAPHIC SEPARATION OF SACCHARIDES USING POLYMERIC MACROPOROUS ALKYLENE-BRIDGED RESIN

(71) Applicants: Dow Global Technologies LLC, Midland, MI (US); Rohm and Haas Company, Collegeville, PA (US)

(72) Inventors: Daryl J. Gisch, Midland, MI (US); Christopher R. Eicher, Midland, MI (US); Stephen Pease, Ambler, PA (US); Gongwei Pu, Shanghai (CN)

(73) Assignees: DOW GLOBAL TECHNOLOGIES LLC; ROHM AND HAAS COMPANY

( * ) Notice: Subject to any disclaimer, the term of this patent is extended or adjusted under 35 U.S.C. 154(b) by 0 days.

(21) Appl. No.: 15/542,128

(22) PCT Filed: Feb. 26, 2016

(86) PCT No.: PCT/US2016/019708
§ 371 (c)(1),
(2) Date: Jul. 7, 2017

(87) PCT Pub. No.: WO2016/144567
PCT Pub. Date: Sep. 15, 2016

(65) Prior Publication Data
US 2018/0257003 A1 Sep. 13, 2018

Related U.S. Application Data

(60) Provisional application No. 62/131,898, filed on Mar. 12, 2015.

(51) Int. Cl.
*C13K 1/08* (2006.01)
*C13K 1/00* (2006.01)
(Continued)

(52) U.S. Cl.
CPC ............ B01D 15/362 (2013.01); B01J 39/05 (2017.01); B01J 39/20 (2013.01); B01J 39/26 (2013.01);
(Continued)

(58) Field of Classification Search
CPC ...... B01D 15/08; B01D 15/36; B01D 15/361; B01D 15/362; B01J 20/28002;
(Continued)

(56) References Cited

U.S. PATENT DOCUMENTS 2,500,149 A 3/1950 Boyer
2,631,127 A 3/1953 D'Alelio
(Continued)

FOREIGN PATENT DOCUMENTS

EP 0481603 4/1992
WO 1991003574 3/1991

OTHER PUBLICATIONS

V.A. Davankov and M.P. Tsyurupa, "Structure and Properties of Hypercorsslinked Polystyrene—The First Representative of a New Class of Polymer Networks", React. Polym, 1990 (vol. 13) 27.
(Continued)

*Primary Examiner* — Katherine Zalasky

(57) ABSTRACT

A method for chromatographically separating a first saccharide from a liquid eluent comprising the first saccharide and a second saccharide by passing the liquid eluent through a bed including a polymeric macroporous alkylene-bridged resin in calcium form.

9 Claims, 2 Drawing Sheets

(51) Int. Cl.
*B01J 39/20* (2006.01)
*B01D 15/36* (2006.01)
*B01J 39/26* (2006.01)
*C13K 11/00* (2006.01)
*B01J 39/05* (2017.01)

(52) U.S. Cl.
CPC ............... *C13K 1/00* (2013.01); *C13K 1/08* (2013.01); *C13K 11/00* (2013.01)

(58) Field of Classification Search
CPC .......... B01J 20/28011; B01J 20/28057; B01J 20/28061; B01J 20/28064; B01J 20/28066; B01J 20/28054; B01J 20/28076; B01J 20/28069; B01J 20/285; B01J 39/04; B01J 39/05; B01J 39/26; B01J 39/20; C13K 1/00; C13K 1/04; C13K 1/08; C13K 11/00
See application file for complete search history.

(56) References Cited

U.S. PATENT DOCUMENTS

| | | |
|---|---|---|
| 2,642,417 A | 6/1953 | Wheaton et al. |
| 2,664,801 A | 1/1954 | Eisbein |
| 2,764,564 A | 9/1956 | McMaster et al. |
| 2,960,480 A | 11/1960 | Thielen |
| 2,985,589 A * | 5/1961 | Broughton ......... B01D 15/1828 208/310 R |
| 2,992,544 A | 7/1961 | McMaster |
| 3,037,052 A | 5/1962 | Bortnick |
| 3,266,007 A | 8/1966 | Sullivan |
| 3,729,457 A | 4/1973 | Davankov et al. |
| 4,096,036 A * | 6/1978 | Liu .................... C13K 3/00 127/46.2 |
| 4,182,633 A * | 1/1980 | Ishikawa ........... B01D 15/1828 127/46.2 |
| 4,191,813 A | 3/1980 | Reed et al. |
| 4,224,415 A | 9/1980 | Meitzner et al. |
| 4,256,840 A * | 3/1981 | Meitzner ............. B01D 15/361 521/29 |
| 4,263,407 A | 4/1981 | Reed, Jr. |
| 4,358,322 A * | 11/1982 | Neuzil ................ C13K 3/00 127/46.1 |
| 4,419,245 A | 12/1983 | Barrett et al. |
| 4,519,845 A * | 5/1985 | Ou ................... C13B 20/148 127/46.2 |
| 4,564,644 A | 1/1986 | Harris |
| 4,902,413 A * | 2/1990 | Stout ................... B01D 15/08 210/198.2 |
| 4,950,332 A | 8/1990 | Stringfield et al. |
| 4,965,083 A | 10/1990 | Norman et al. |
| 5,021,253 A | 6/1991 | Dawson-Ekeland et al. |
| 5,023,061 A * | 6/1991 | Snyder ............... B01D 15/1892 423/2 |
| 5,079,274 A | 1/1992 | Schneider et al. |
| 5,176,832 A | 1/1993 | Dorta et al. |
| 5,221,478 A | 6/1993 | Dhingra et al. |
| 5,231,115 A | 7/1993 | Harris |
| 5,244,926 A * | 9/1993 | Harris ................. B01J 20/26 521/148 |
| 5,248,435 A | 9/1993 | Morita et al. |
| 5,288,307 A | 2/1994 | Goltz et al. |
| 5,416,124 A * | 5/1995 | Stringfield .............. C08F 8/00 521/146 |
| 5,460,725 A | 10/1995 | Stringfield |
| 5,509,956 A | 4/1996 | Opperman et al. |
| 5,616,622 A | 4/1997 | Harris et al. |
| 5,683,600 A | 11/1997 | Kelley et al. |
| 5,730,877 A * | 3/1998 | Heikkila ............ B01D 15/1828 127/46.2 |
| 5,893,947 A | 4/1999 | Pease et al. |
| 5,972,121 A * | 10/1999 | L'Hermine ............ C13K 1/08 127/46.2 |
| 2002/0002267 A1 | 1/2002 | Long |
| 2004/0006145 A1 | 1/2004 | Dimotsis et al. |

OTHER PUBLICATIONS

V.A. Davankov, et.al. "Structure and Adsorbent Properties of Hypercrosslinked Polystyrene Sorbents" in Ion Exchange Developments and Applications, ed. J.A. Greig (1996).

* cited by examiner

CHROMATOGRAPHIC SEPARATION OF SACCHARIDES USING POLYMERIC MACROPOROUS ALKYLENE-BRIDGED RESIN

FIELD

The invention relates the use of polymeric macroporous alkylene-bridged resins to chromatographically separate sugars including monosaccharides such as fructose and glucose.

INTRODUCTION

The current state of the art for chromatographic separation of sugars (e.g. fructose and glucose) utilizes strong acid gel ion exchange resins in calcium form ($Ca^{+2}$). A representative resin is DOWEX™ MONOSPHERE™ 99Ca/320 available from The Dow Chemical Company. See also U.S. Pat. No. 5,176,832. These types of chromatographic resins do not "exchange" ions in the traditional sense. Rather the bound $Ca^{+2}$ ions form ligand interactions with the hydroxyl (—OH) and carbonyl (C=O) groups of sugar molecules. Fructose has more "absorbing" interactions with the $Ca^{+2}$ ions and thus is more strongly retained by the resin as compared with glucose. Fructose with three —OH groups and two C=O groups is classified as a ketone while glucose with four —OH and one C=O groups is classified as an aldehyde. Mechanistically, the negative dipole of the C=O group interacts with the transient positive charge of the resin bound $Ca^{+2}$ ion. In an aqueous environment such interactions are weak and do not involve bond formation or breakage. The proximity of the two C=O groups held by fructose yield the stronger binding of the pair, resulting in a longer retention for fructose as compared to glucose.

The chromatographic separation of sugars is a rate-controlled and rate-limited process. The slowest step with a typical gel resin is the "diffusion" of sugar molecules in and out of the resin bead. Slower diffusion kinetics can result from resins having larger bead sizes or non uniform "tightness" (cross-linking). Slower diffusion kinetics yield broader and lower chromatographic peaks, i.e. lower recoveries and higher water usage. For gel resins, lower cross-linking yields faster diffusion kinetics, but bead deformation in larger working beads can lead to high pressure drop and bead breakage. Similarly, smaller size gel resins yield faster diffusion kinetics, but require higher crosslinking to avoid bead breakage. Higher crosslinking levels require even higher operating pressures to load effectively.

As gel resins undergo interactions with various salts and organics present in a feed sugar solution, the resins shrink and swell resulting in a less stable bed pack and requiring more system tuning during use. Moreover, exposure to protic solvents with oxygen leads to oxidative degradation of the resin which negatively affects both operational efficiency and bed life. Such oxidative degradation reduces bead stability as exhibited by increased water retention with aging, higher bead deformation and more shifts in the chromatographic bed due to shrink/swell shifts.

SUMMARY

The present invention is an alternative approach to the long-standing trend toward use of progressively smaller gel bead sizes operating under progressively greater pressures. Specifically, the present invention involves the substitution of current strong acid gel-type ion exchange resins with a polymeric macroporous alkylene-bridged resin. In preferred embodiments the subject resin possesses a much higher surface area and porosity which yields faster diffusion as compared with current gel-type ion exchange resins. Moreover, the more rigid morphology of the macroporous resins allows for use of higher operating pressures with less bead deformation and breakage. In preferred embodiments, the subject resins experience less shrink/swell effects resulting in a more stable resin bed platform. Given the presence of alkylene bridging in the resin matrix, the subject resins are also less prone to oxidative degradation resulting in a more stable chromatographic bed.

The invention includes a method for chromatographically separating a first saccharide from a liquid eluent including the first saccharide and a second saccharide by passing the liquid eluent through a bed including a polymeric macroporous alkylene-bridged resin in Ca form.

DETAILED DESCRIPTION

Figure 1:
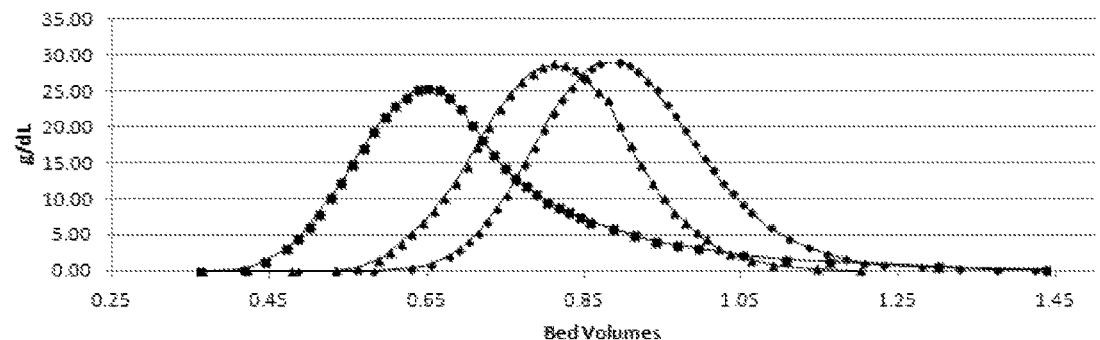
FIG. 1 is a comparative plot (g/dL vs. bed volume) of retained dissolved solids obtained by passing a whole high fructose corn syrup through beds of three different resins, each provided in calcium form: i) DOWEX™ MARATHON C (a gel type, strong acid cation resin in the calcium (Ca) form designated as "☐"), ii) DOWEX™ MONOSPHERE 88 (a macroporous type, strong acid cation resin in the Ca-form designated as "Δ") and iii) a methylene bridged type, strong acid cation resin in the Ca-form designated.

The invention includes a method for chromatographically separating a first saccharide (analyte) from a liquid eluent including multiple saccharides, (e.g. a first and second saccharide). While the liquid eluent may include a variety of constituents, e.g. monosaccharides, disaccharides, oligosaccharides, organic acids, amino acids, inorganic salts, etc., the first and second saccharides are preferably monosaccharides (e.g. glucose and fructose). For example, in the production of high fructose corn syrup, the liquid eluent typically includes an aqueous mixture of glucose (first saccharide) and fructose (second saccharide) along with various acids and salts. As with traditional chromatographic separations of saccharides, the liquid eluent (mobile phase) passes through a bed or stratum of resin (stationary phase). The set up and operation of the bed is not particularly limited, e.g. moving, simulated moving and stationary beds may be used. Given the nature of the interactions with the resin, the first and second saccharides pass through the resin bed at different rates, thus allowing their separation. For example, fructose (second saccharide) more strongly interacts with the resin as compared with glucose (first saccharide). As a consequence, glucose passes (elutes) through the bed more quickly followed by fructose as a separate product "cut". The individual product cuts can then be collected and used or further treated as is customary in the art.

The resin used in the present invention is a functionalized version of a well-known class of adsorbents, i.e. polymeric macroporous alkylene-bridged adsorbent sometime also referred to as "macronets" or "hypercrosslinked" adsorbents. Methods for preparing and characterizing such adsorbents are well documented. See for example: U.S. Pat. Nos. 3,729,457, 4,263,407, 4,950,332, 4,965,083, 5,460,725, 5,616,622 and 5,683,600 which are incorporated herein by reference. See also: V. A. Davankov, et al., Reaction Polymers, vol. 13, 27 (1990) and V. A. Davankov et al., "Structure and Adsorbent Properties of Hypercrosslinked Polystyrene Sorbents," Ion Exchange Developments and Applications, ed. JA. Greig (1996). Commercial examples of such adsorbents include DOWEX™ OPTIPORE™ polymeric adsorbents available from The Dow Chemical Company. Traditional uses of such adsorbents include decolorization (U.S. Pat. No. 4,950,332), demineralization (U.S. Pat. No. 5,893,947), debittering (U.S. Pat. No. 4,965,083), acid removal (EP0481603), decaffeination (U.S. Pat. No. 5,021,253) and hydrocarbon removal (U.S. Pat. Nos. 5,079,274, 5,288,307, 5,509,956). The adsorbent is subsequently functionalized (sulfonated) and converted to a calcium form "resin" using standard techniques commonly used in connection with ion exchange resins. Techniques for functionalizing polymeric macroporous alkylene-bridged adsorbents are described in U.S. Pat. Nos. 4,950,332, 5,616,622 and 5,893,947. The subject resins are preferably provided in bead form having a median diameter from 10 to 2000 microns, and more preferably from 100 to 1000 microns. The beads may have a Gaussian particle size distribution or may have a relatively uniform particle size distribution, i.e. "monodisperse" that is, at least 90 volume percent of the beads have a particle diameter from about 0.8 to about 1.2, and more preferably 0.85 to 1.15 times the volume average particle diameter.

The subject resins are macroporous. The term "macroporous" as commonly used in the art means that the polymer has both macropores and mesopores. Mesopores have diameters of from about 20 Å to about 200 Å and macropores have diameters greater than about 200 Å. While the subject resin also includes micropores (diameters less than 20 Å), the presence of macropores distinguishes the subject resin from gel-type or microporous ion exchange resins. The microporosity of subject resins preferably ranges from about 0.2 to 0.4 cc/g. At the same time, the mesoporosity preferably exceeds 0.5 cc/g, the preferred range being between from 0.5 to 1.3 cc/g. In order to attain a proper balance between capacity and exchange rate, the microporosity is preferably less than 20 percent of the total porosity. The macroporosity is preferably from 0.55 cc/g to 0.85 cc/g and preferably comprises at greater than 70% of the total porosity. The total pore volume for the subject resin (in calcium form) is in the 0.75 to 0.90 cm$^3$/g.

The subject resins are distinguishable from strong acid cationic macroporous ion exchange resins by having a ratio of alkylene bridging to phenol of 0.1 to 0.9:1, 0.4 to 0.8:1 and more preferably 0.6 to 0.8:1 (see U.S. Pat. No. 5,079,274). A preferred technique for determining the percent of alkylene bridging involves comparing (via standard titration techniques) the percent of functional conversion of a chloromethylated, non-bridged, aminated (using dimethyl amine) resin to a bridged counterpart resin. As a result of bridging, the bridged resin will include a lower degree of functionalization (i.e. fewer amine groups). This technique was used in the Examples provided below.

The subject resins are further distinguishable from strong acid cationic macroporous exchange reins by possessing relatively high surface areas, e.g. 300 to 2100 m$^2$/g, 400 to 1500 m$^2$/g, and more preferably from 450 to 700 m$^2$/g). Porosity (pore volume per gram of sample), average pore size and surface area are determined by the nitrogen adsorption method in which dried and degassed samples are analyzed on an automatic volumetric sorption analyzer. The instrument works on the principle of measuring the volume of gaseous nitrogen adsorbed by a sample at a given nitrogen partial pressure. The volumes of gas adsorbed at various pressures are used in the B.E.T. model for the calculation of the surface area of the sample. The average pore radius is calculated from the relationship between the surface area and the pore volume of the sample, assuming a cylindrical pore geometry.

In another preferred embodiment, the subject resins have a percent shrink/swell range below about 15%, more preferably below about 7% and most preferably below about 4%. Percent shrink/swell is determined by measuring the volume expansion or contraction of the resin when subject to hydration.

In another embodiment, the subject resin has water retention of greater that 50% moisture being held within a fully hydrated bead. This can be determined by weighing a known volume of a drained resin sample, placing on the drying balance, and drive off the moisture held with-in the resin beads until the resin achieves a constant weight. The moisture hold impacts the kinetic access to the resin.

In another preferred embodiment, the subject resin has an average crush strength of at least 300 g/bead and more preferably 400 g/bead as measured by crushing forty individual beads using a Chatillon platform system, model TCD 200 or equivalent.

The polymeric macroporous alkylene-bridged resins of the present invention are based upon a porogen-modified crosslinked copolymer matrix of at least one monovinyl aromatic monomer and a polyvinyl aromatic crosslinking monomer. The crosslinked copolymer matrix is further crosslinked by subsequent alkylene bridging.

Monovinyl aromatic monomers include styrene, vinyltoluenes, ethylvinylbenzenes and vinylnaphthalenes and may also include heterocyclic monomers such as vinylpyridine. The preferred monovinyl aromatic monomers include styrene, vinyltoluene, ethylvinylbenzene and mixtures thereof. Styrene, ethylvinylbenzene and their mixtures are most preferred. The monovinyl aromatic monomers comprise of from 45 to 80 weight percent of the total monomer mixture, preferably of from 65 to 80 weight percent of the total monomer mixture.

Monovinyl aliphatic monomers include derivatives of acrylic and methacrylic acids and acrylonitrile. The preferred monovinyl aliphatic monomers include methyl methacrylate, acrylonitrile, ethyl acrylate, 2-hyroxyethyl methacrylate and mixtures thereof. The monovinyl aliphatic monomers comprise of from 0 to 20 weight percent of the total monomer mixture. Since subsequent alkylene bridging occurs between aromatic rings, it is often preferable not to employ any monovinyl aliphatic monomer or to keeps its amount to a minimum.

Polyvinyl aromatic crosslinking monomers include divinylbenzene and trivinylbenzene with divinylbenzene being most preferred. Commercial divinylbenzene typically consists of from 55 to 80 weight percent divinylbenzene in admixture with from 20 to 45 weight percent ethylvinylbenzene. The actual polyvinyl aromatic crosslinking monomer comprises of from 20 to 35 weight percent of the total monomer mixture. In any given instance, the ratio of the monovinyl aromatic and aliphatic monomer to the polyvinyl aromatic crosslinking monomer is from 1.8 to 4.0.

The crosslinked copolymer matrix which form the basis of the present invention are porogen-modified, i.e., they are prepared by suspension polymerization in the presence of a porogenic solvent or a mixture of two or more such porogenic solvents. Porogenic solvents are those solvents which are suitable for forming pores and/or displacing the polymer chains during polymerization. The characteristics and use of such solvents in the formation of macroporous resins are described in U.S. Pat. No. 4,224,415. A porogenic solvent is one which dissolves the monomer mixture being copolymerized but which does not dissolve the copolymer. In addition, the porogenic solvents must be inert to the polymerization conditions, i.e., neither interfere with or enter into the polymerization. For the crosslinked copolymers prepared from the monovinyl aromatic monomers and the polyvinyl aromatic crosslinking monomers of the present invention, aromatic hydrocarbons like toluene, xylene and ethylbenzene, $C_6$-$C_{12}$ saturated aliphatic hydrocarbons like heptane and iso-octane and $C_4$-$C_{10}$ alkanols like tert-amyl alcohol, sec-butanol and 2-ethylhexanol are particularly effective. Aromatic hydrocarbons and $C_6$-$C_{12}$ saturated aliphatic hydrocarbons and their mixtures are preferred; toluene alone or in mixtures with a $C_6$-$C_8$ saturated aliphatic hydrocarbon is most preferred. A sufficient concentration of porogenic solvent is required to effect phase separation or polymer chain displacement. Typically, the porogenic solvent comprises of from 50 to 70 weight percent and preferably from 55 to 65 weight percent of the total weight of the monomer mixture and the porogenic solvent.

The term suspension polymerization is a term well known to those skilled in the art and comprises suspending droplets of the monomer or monomer mixture and of the porogenic solvent in a medium in which neither are soluble. This may be accomplished by adding the monomer or monomer mixture and the porogenic solvent with any additives to the suspending medium which contains a dispersing or suspending agent. For the ethylenically unsaturated aromatic monomers of the present invention, the suspending medium is usually water and the suspending agent a suspension stabilizer, e.g., gelatin, polyvinyl alcohol or a cellulosic such as hydroxyethyl cellulose, methyl cellulose or carboxymethyl methyl cellulose. When the medium is agitated, the organic phase (monomer and progenic solvent) disperses into fine droplets. Polymerization is accomplished by heating in the presence of a free-radical initiator. The free-radical initiator may be any one or a combination of conventional initiators for generating free radicals in the polymerization of ethylenically unsaturated monomers. Representative initiators are UV radiation and chemical initiators, such as azo-compounds like azobisisobutyronitrile; and peroxygen compounds such as benzoyl peroxide, t-butylperoctoate, t-butylperbenzoate and iso-propylpercarbonate. Only a catalytic amount of initiator is required. The usual range is from about 0.01 to about 3 percent of initiator with reference to the weight of the monomer mixture. The preferred range is from 0.1 to 1.5 percent. The optimum amount of initiator is determined in large part by the nature of the particular monomers selected, the nature of the impurities present and the volume of porogen used. For example, when higher levels of polyvinyl aromatic crosslinking monomer is employed, it may be necessary to use a greater percentage of free-radical initiator, e.g. greater than 0.5 weight percent.

In a typical suspension polymerization, the organic phase containing monomer, porogenic solvent and initiator is suspended within an agitated aqueous medium. Generally, the suspending medium is employed in an amount of from 30 to 70 weight percent, preferably from 35 to 50 weight percent based on the total weight of organic phase and suspending medium. The polymerization is conducted at a temperature from between 30° and 130° C., preferably from between 70° and 110° C.

Alternatively, the copolymer beads can be prepared by a seeded, continuous-addition process as described, for example, in U.S. Pat. Nos. 4,419,245, 4,564,644 and 5,231,115 which are incorporated herein by reference. In such a process, seed particles of crosslinked copolymer are suspended in an aqueous phase and swelled with an organic phase as described above, i.e., monomer mixture, porogenic solvent and initiator. After 40 to 95 percent polymerization, a second organic phase is continuously added while polymerization continues. The second organic phase can be the same as the first or different provided that the ratios of monovinyl aromatic monomer, polyvinyl aromatic crosslinking monomer and porogenic solvent are within the limitations of the present invention. Preferably, the second organic phase is devoid of initiator.

The resins of the present invention can be prepared from the aforementioned crosslinked copolymer beads by additional alkylene-bridging (post-crosslinking) of individual polymer chains after polymerization. Post-crosslinking may be achieved by first swelling the copolymer beads under non-reactive conditions with a swelling agent along with the haloalkylating agent and an effective amount of a Friedel-Crafts catalyst. The haloalkylating agent advantageously has the Friedel-Crafts catalyst incorporated therein. The swollen copolymer beads are then maintained at a temperature sufficient to react the haloalkylating agent with the copolymer beads until achieving a desired degree of reaction, usually from 0.6 to 0.7 haloalkyl groups per aromatic ring. The reaction temperature can be from 20° C. to 180° C. More preferably, the temperature is from 60° C. to 85° C. Methods for haloalkylating copolymer beads are described in: U.S. Pat. Nos. 2,642,417, 2,960,480, 2,992,544, 4,191,813, 4,263,407 and 4,950,332 which are incorporated herein by reference.

Friedel-Crafts catalysts are Lewis acids and include for example, $AlCl_3$, $FeCl_3$, $BF_3$ and HF. $AlCl_3$ and $FeCl_3$ are preferred. Preferred haloalkylating agents include chloromethyl methyl ether and $\alpha,\alpha'$-dichloroxylene, with chloromethyl methyl ether being most preferred. Suitable swelling agents are solvents which are substantially inert during post-crosslinking of the haloalkylated copolymer and include chlorinated hydrocarbons, such as dichloroethane, chlorobenzene, dichlorobenzene, methylene chloride, and propylene dichloride, or nitrogen-substituted aromatics, like nitrobenzene.

When the copolymer matrix is chloromethylated, reaction of a chloromethyl group with the aromatic ring of an adjacent copolymer chain results in formation of an alkylene bridge or in this example, a methylene bridge, i.e., a ($-CH_2-$) moiety, between two copolymer chains as illustrated in the following reaction pathway.

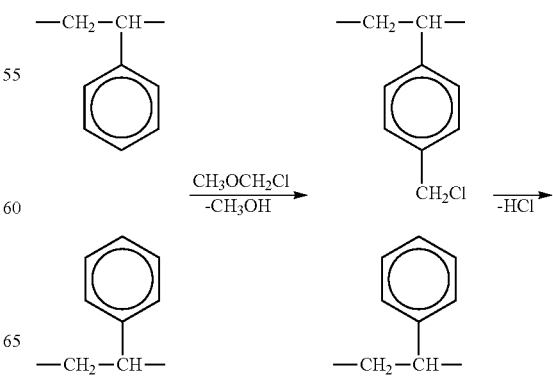

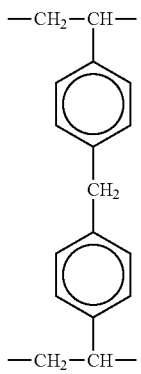

After formation of the bridging moiety, the haloalkylating agent and swelling agent may be removed by conventional methods, such as solvent extraction, washing, drying, or a combination thereof. If a drying step is used, it is preferred to avoid an oxygen-containing atmosphere at temperatures above normal room temperature.

The alkylene-bridge matrix may then be functionalized (sulfonated) using classic methods described in the literature. See for example: U.S. Pat. Nos. 2,500,149, 2,631,127, 2,664,801, 2,764,564, 3,037,052, 3,266,007, 5,248,435, 5,616,622, US2002/002267 and US2004/0006145; relevant teachings of which are incorporated herein by reference. In general, sulfonated resins are prepared by reacting the alkylene-bridged copolymer matrix with a sulfonation agent, such as concentrated sulfuric acid (acid which has at least about 95 weight percent sulfuric acid based upon total weight), oleum, chlorosulfonic acid, or sulfur trioxide, at a temperature and for a time sufficient to achieve a desired degree of sulfonation. A preferred sulfonation agent is concentrated sulfuric acid. The amount of concentrated sulfuric acid should be sufficient to provide adequate mixing during reaction, with a weight ratio of acid to beads of from about 2:1 to about 20:1 being generally sufficient. Typically, the acid and copolymer beads are maintained at a temperature from about 0° C. to about 200° C. for a time sufficient to obtain resin having a dry weight capacity of at least about 0.5 milliequivalents per gram (meq/g). Sulfonation may be conducted in the presence of a swelling agent. Representative swelling agents include: methylene chloride, ethylene dichloride, dichloropropane, sulfur dioxide, benzene, toluene, xylene, ethylbenzene, isopropylbenzene, chlorobenzene, nitrobenzene, nitromethane, tetrachloroethane and tetrachloroethylene.

The sulfonated resin is subsequently converted to its calcium form using standard techniques as used with respect to ion exchange resins. For example, the sulfonated resin may be combined, agitated and soaked within a 1M solution of $CaCl_2$. The resin may then be optionally soaked within a saturated solution of $Ca(OH)_2$ followed by optionally pH adjustment, e.g. with a solution of $H_3PO_4$. The treatment with $CaCl_2$ may be repeated multiple times to ensure a high level of conversion.

EXAMPLES

Figure 2:
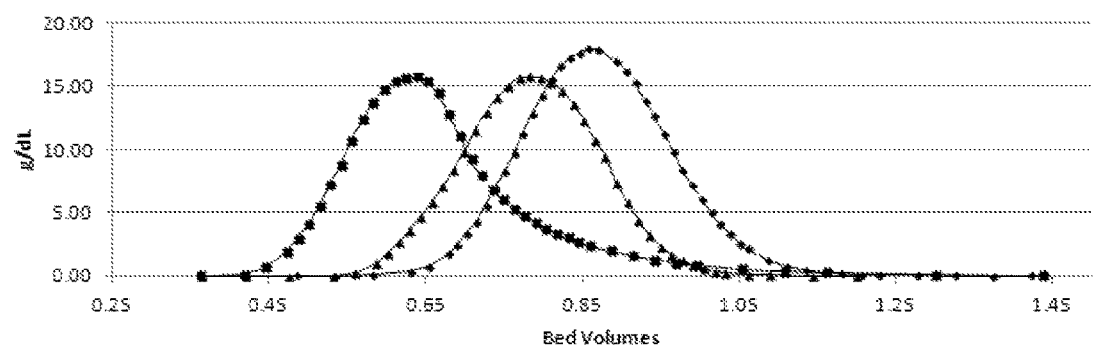
FIGS. 2 and 3 are similar comparative plots for glucose and fructose fractions, respectively.
Figure 3:
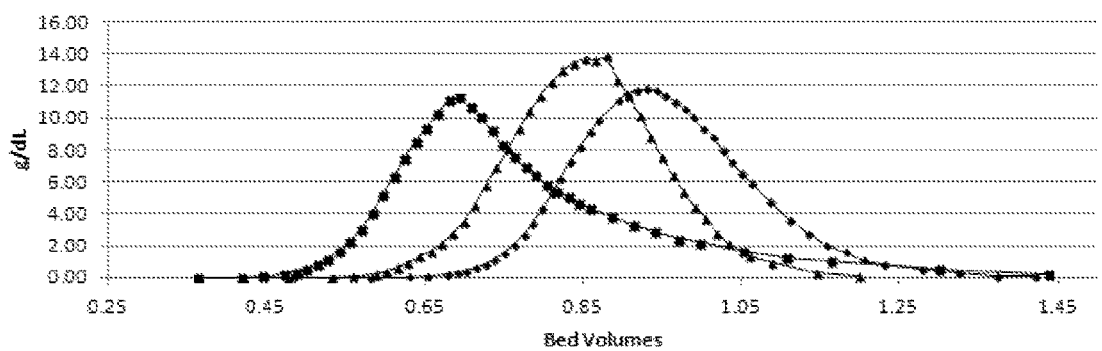

Comparative testing was conducted on three commercial resins to determine the relative ability to resolve high fructose corn syrup into enriched fractions of glucose and fructose. Results are provided in FIGS. 1 to 3. Bed size and testing conditions where identical for each resin. Pulse testing conditions were as follows:

| | |
|---|---|
| Sugar Type | HFCS42 (high fructose corn syrup) |
| Sugar Pulse Volume (% CV) | 11.2 |
| Sugar Concentration (Bx) | 50 |
| Flow Rate (BV/hr) | 1.2 |
| Column Temperature (C) | 60 |
| Column Dimensions (mm) | 24.5 × 1219 |
| Total Bed Volume (mL) | 625 |
| Packing | $CaCl_2$ Pack |

Three commercial resins were tested as listed below. Selected properties of the resins are provided in Table 1. Results are shown in FIGS. 1-4. Each resin comprises a functionalized crosslinked styrene-divinylbenzene copolymer matrix provided in Ca form.

i) (□) DOWEX™ MARATHON C (a gel type, strong acid cation resin in the calcium (Ca) form)

ii) (Δ) DOWEX™ MONOSPHERE 88 (a macroporous type, strong acid cation resin in the Ca-form)

iii) (◇) a methylene bridged type, strong acid cation resin in the Ca-form). The calcium form sulfonated OPTIPORE TYPE resin used in this study was generated by using the commercially manufactured methylene bridged copolymer as used to produce the commercial OPTIPORE adsorbents, where the resultant methylene bridged copolymer was functionalized using standard sulfonation conditions employed to generate typical strong acid cation resins. Once converted to a strong acid cation form resin with a hydrogen counter ion, said cation resin was converted to the calcium form using molar excesses of calcium chloride.

Figure 4:
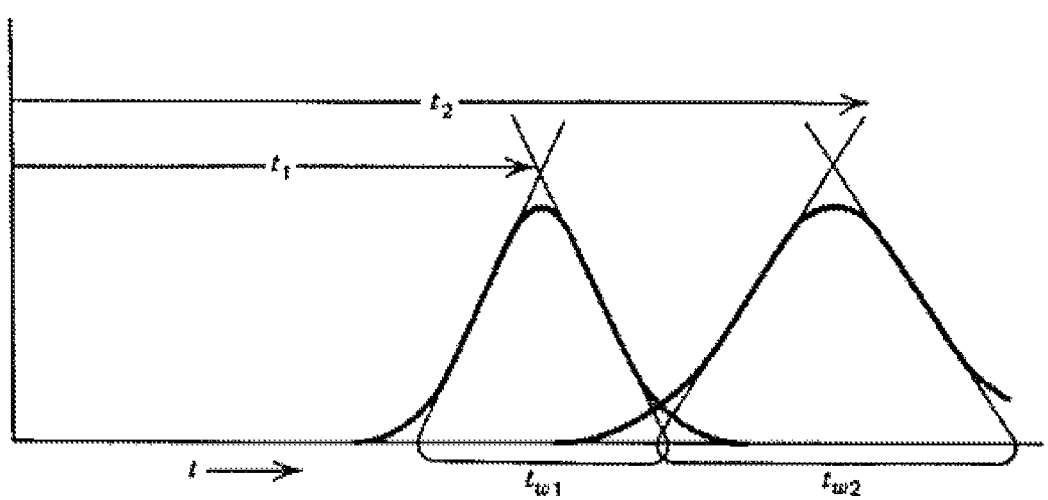
FIG. 4 is a plot showing chromatographic resolution of glucose and fructose along with an equation for calculating resolution (R).

The chromatographic resolution of two components is determined experimentally by measuring the peak position and the broadness-based calculation as shown in FIG. 4. The resulting resolution values (R) allow for the comparison of various chromatographic media when the measurements are made using the same pulse testing conditions. The larger the R value the greater the efficiency of media. A perfect value would be 1.0000, where the two components are completely resolved. But the commercial practicality drives to operational conditions where the feed being pulsed onto the media to is of concentration to reduce the re-concentration in steps after the separation. When processing in such a manner the pulse volume of feed places the media in an overload condition and the R values for the operation will be <1.0000. The resulting value can be thought of as the percent of feed totally separated into two components (R×100=percent totally separated). Results are summarized in Table 1.

TABLE 1

| Resin | Volume Mean Diameter (μm) | Total Exch. Capacity (meq/ml) | Surface Area ($m^2/g$) | Crush Strength (%300 g/bead/ $Ave_{40}$ beads) | Resolution Glu/Fru (BV: 1.1) | Alkylene bridging |
|---|---|---|---|---|---|---|
| *DOWEX MARATHON C (□) | 583 | 1.89 | 0 | 97.5/1010 | 0.1870 | N/A |
| *DOWEX MONOSPHERE 88 (Δ) | 554 | 1.73 | 30.3 | 92.5/494 | 0.1882 | N/A |
| Alkylene-bridged (20/+50) (◇) | 581 | 0.68 | 568.9 | 100/1011 | 0.2065 | >45% |

*Comparison examples (not part of the present invention)
**Alkylene bridging determined by measuring the percent of cross-linked aromatic rings based upon the total number of aromatic rings in the polymer.

The invention claimed is:

1. A method for chromatographically separating a first saccharide from a liquid eluent comprising the first saccharide and a second saccharide by passing the liquid eluent through a bed comprising a polymeric macroporous alkylene-bridged resin in calcium form; wherein said polymeric macroporous alkylene-bridged resin comprises pores having diameters greater than 200 Å and a macroporosity which is greater than 70% of a total pore volume.

2. The method of claim 1 wherein the resin as a surface area of from 300 to 2100 $m^2$/g.

3. The method of claim 1 wherein the resin as a surface area of from 450 to 700 $m^2$/g.

4. The method of claim 1 wherein the resin has a ratio of alkylene bridging to phenol of from 0.1 to 0.9:1.

5. The method of claim 1 wherein the resin has a ratio of alkylene bridging to phenol of from 0.6 to 0.8:1.

6. The method of claim 1 wherein the total pore volume of the resin is from 0.75 to 0.90 $cm^3$/g.

7. The method of claim 1 wherein the resin is provided in bead form having a median diameter of from 100 to 1000 microns.

8. The method of claim 1 wherein at least 90 volume percent of the beads have a particle diameter from about 0.9 to about 1.1 times the volume average particle diameter.

9. The method of claim 1 wherein the first and second saccharide comprises glucose and fructose, respectively.

* * * * *